April 13, 1948.  H. NUTT  2,439,630
FLUID COUPLING
Filed April 11, 1945
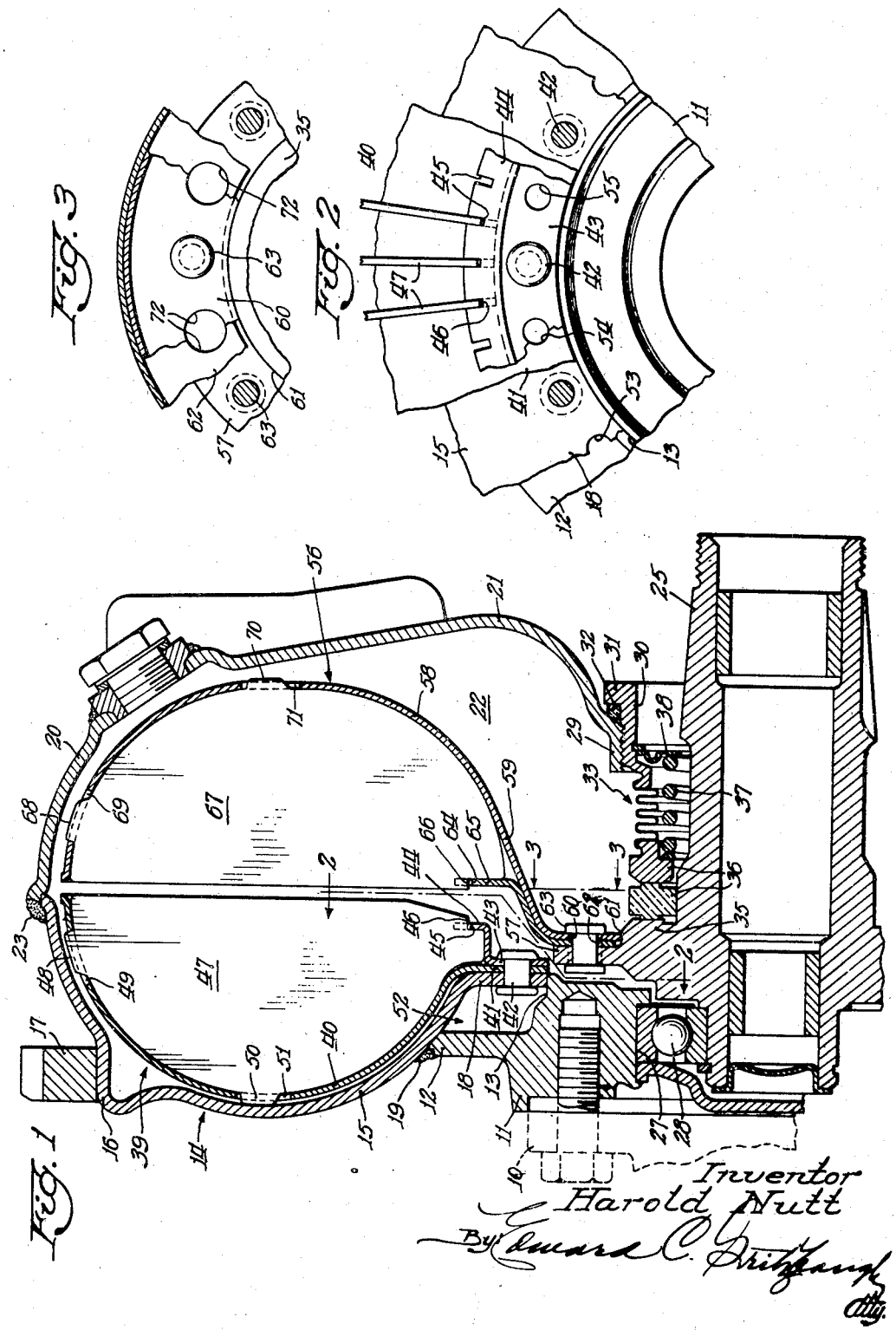
Inventor
Harold Nutt Patented Apr. 13, 1948

2,439,630

UNITED STATES PATENT OFFICE 2,439,630

FLUID COUPLING

Harold Nutt, Chicago, Ill., assignor to Borg-Warner Corporation, Chicago, Ill., a corporation of Illinois Application April 11, 1945, Serial No. 587,652

9 Claims. (Cl. 103—115)

The present invention relates generally to fluid couplings for transmitting torque from a driving member to a driven member. More particularly the improvements contemplate a novel arrangement wherein a vaned driving wheel is assembled with a housing member to provide a unitary structure which is adapted, as a unit, to be readily mounted on and secured to a drive shaft or hub. This arrangement is such that an annular expansion space is provided exterior to the housing and such space is adapted to be ported through the unitary structure to the fluid circuit chamber within the housing. Also the housing members may be united by exterior welding, and said unitary structure may be welded at its exterior to the driving shaft or hub.

Heretofore, numerous arrangements have been employed for anchoring the impeller assembly to the outer housing, and for mounting the blades in the shells of the impeller and the runner or driven member. A prior arrangement extensively employed has been to use interior spot welding to attach the impeller shell to the outer housing at different points near the bottom of the torus pockets. Also the blades have heretofore been riveted to the torus shell or they were provided with ears projected through open slots in the shell and then turned over on the exterior of the wheel shell. These prior arrangements have proven unsatisfactory due to frequent loosening or failure of the spot welding, and the fact that the rivets and ears tended to create some turbulences to smooth fluid flow. In another known arrangement, each blade has been fastened by spot welding several ears on its periphery to the torus shell, but this has proven objectionable because it necessitated a large number of inside welding operations which requires considerable time, and also such ears disturb the smoothness of the fluid circuit.

The present arrangement eliminates the above-stated inherent objections to the prior arrangements because it requires no welds inside the coupling or housing, and no irregularities are presented to the fluid circuit. This is due to the fact that the entire group of blades in the impeller are held in place by an annular or ring baffle which is first riveted to the adjacent housing stamping and then said housing is conveniently welded onto the hub flange by a continuous outside weld. The blades of the driven shell or runner are retained in position by a ring baffle and the runner shell and baffle are riveted to the driven hub flange. The exterior housing, which has a substantially toroidal shape, is formed at its radially inward region with an enlarged portion which provides a suitable expansion chamber which has communication with the fluid circuit through ports in riveted regions of the hub flange, the ring baffle and the shell of the runner assembly and also through other ports in the riveted portions of the housing, ring baffle and shell of the impeller assembly.

It is, therefore, one of the principal objects of this invention to simplify the construction of a fluid coupling such as contemplated herein, and to improve the efficiency, operation and dependability of such coupling.

Another principal object of this invention is to provide effective means for securing together the inner shell and blade assembly and to anchor these parts to the outer housing of a fluid coupling in a manner so that outside welding may be utilized thereby affording access to the welds at all times for easy repair in the event of rupture or leakage at a welded joint.

A still further principal object hereof is to provide means in the arrangement contemplated herein for porting the fluid in the wheel to an expansion chamber near the hub preferably exterior to the housing.

Still another object is to provide an arrangement in a fluid coupling whereby the drive shell and its blades are quickly assembled as a unit with the rotor housing, by securing such assembly in place by rivet means prior to anchoring the housing to the rotatable driving hub or flywheel. This arrangement makes possible the final assembly with the hub to be through the medium of a simple outside welding operation.

Additional objects, aims and advantages of the invention contemplated herein will be apparent to persons skilled in the art after the construction and operation of the fluid coupling is understood from the within description. It is preferred to accomplish the numerous objects of this invention and to practice the same in substantially the manner hereinafter fully described and as more particularly pointed out in the appended claims.

Reference is now made to the accompanying drawings that form a part of this specification, in which:

Fig. 1 is an axial section of a fragmentary portion, preferably the upper half of a fluid coupling, showing the present improvements;

Fig. 2 is an elevation of a fragmentary portion of the driving side of the coupling with portions broken away in several stages or planes to show details of the present improvements; and Fig. 3 is a view similar to Fig. 2 and taken along the plane of line 3—3 on Fig. 1.

The drawings are to be understood as being more or less of a schematic character for the purpose of disclosing a typical or preferred form of the improvements contemplated herein, and in these drawings like reference characters identify the same parts in the different views.

The fluid coupling shown in Fig. 1 comprises driving means 10 comprising preferably a shaft, flywheel or the like to which is bolted the hub 11 having a radial flange 12 and a coaxial annular shoulder or seat 13. The driving toroidal housing 14 is mounted on and rotates with the hub 11.

Section 15 of housing 14 is a stamping of semi-circular cross-section and has an annularly arranged shoulder portion 16 which is fitted in and is suitably anchored to a ring gear 17. The radially inward region of housing section 15 is formed with a flat flange portion 18 projecting toward the axis of the housing to engage the seat 13 when the adjacent semi-circular portion is placed on chamfered outer edge of hub flange 12 to which it is secured by a continuous outside weld as at 19.

The other housing section 20 comprises a stamping of asymmetric or distorted semi-toroidal cross-section to provide a well-defined bulged region 21 whereby an annular accumulator chamber 22 is formed within the housing outside the shell of the runner or driven member of the coupling. Adjacent edges of the housing sections 15 and 20 are preferably overlapped and united by a continuous outside weld as at 23 to constitute the closed toroidal housing 14 which is supported on and rotates with the driving member or shaft 10.

A tubular driven shaft 25, axially aligned with drive shaft 10, extends into the toroidal housing 24 and at its inner end projects into a central opening 27 in driving hub 11 where it is supported in a bearing 28 preferably of the antifriction type. The radially inward region of asymmetric housing section 20 has a hollow cylindrical hub or tubular portion 29 surrounding driven shaft 25 in spaced relation thereto. Housing hub 29 is threaded to internally receive a threaded sleeve nut 30 the flange 31 of which compresses a packing ring 32 against the tubular hub 29 of housing section 20 as seen in Fig. 1. A bellows type seal assembly 33 is interposed between the inner end of sleeve nut 30 and an annular boss 35 on driven shaft 25 adjacent the driving hub 11. The members of seal 36 are yieldingly urged toward driven shaft boss 35 by helical spring 37 which at one end abuts said seal and at its other end engages a washer 38 on the interior of sleeve nut 30.

The driving wheel assembly 39 comprises a semi-toroidal shell 40 formed of a metal stamping which is semi-circular in cross-section and is arranged concentric with and close to housing section 15. The radially inward region of shell 40 has a straight radial flange 41 lying flat against the corresponding flange 18 of housing section 15 and secured thereto by rivets 42. A ring-like baffle of Z-shape cross-section has its inner flange 43 disposed flat against flange 41 of the shell and is anchored in place by the rivets 42 to position its other or outer flange 44 in spaced or offset relation to the shell 40. Radial slots 45 are made in the outer free edge of baffle ring flange 44 to provide retainer seats which receive the inner shouldered portions 46 of stamped metal blades 47 arranged in radial array in shell 40. Blades 47 are flat and of semi-circular contour to snugly fit the concave surface of shell 40. Lugs or tabs 48 on the radially outer margins of the arcuate edges of the blades engage in an annular row of notches or slots 49 in proximate portions of shell 40. Other lugs or tabs 50 on the mid-regions of the arcuate edges of blades 47 engage in an intermediate row of notches or slots 51 in the equatorial region of shell 40.

By reason of this particular arrangement the respective flanges 18, 41 and 43 are disposed in the side-by-side manner shown and are then secured together by rivets 42 to effect a unitary assembly prior to being mounted on driving hub 11. This assembled unit is readily anchored in position by placing the inner edges of the flanges on annular seat 13 of driving hub 11 with the housing 15 against hub flange 12 after which the continuous exterior welding 19 is performed to unite the parts. This avoids the objectionable multiplicity of inside welding operations which have heretofore been employed.

As seen in Fig. 1 there is an annular space 52 surrounding driving hub 11 that is closed by said hub, its flange 12, the adjacent region of housing 15, and housing flange 18. This space is ported to the fluid circuit by a plurality of aligned holes 53, 54 and 55 made respectively in the three flanges 18, 41 and 43, thus constituting said space 52 as an annular fluid expansion chamber.

The runner or driven wheel assembly 56 is secured to an annular flange 57 projecting radially from driven shaft boss 35 for transmitting torque to the driven shaft 25. This runner assembly 56 comprises a metal stamping forming a semi-toroidal shell 58 having a substantially semi-circular cross-section the radially inward region of which has a straightened tangent portion 59 terminating in a flat radial flange 60 which rests on the shoulder or seat 61 alongside flange 57. An annular or ring baffle of Z-shape cross-section is arranged with its radially inward flange 62 between flange 57 and the adjacent flange 60 of shell 58. With this side-by-side arrangement of flanges 60 and 62 on hub flange 57 the three members of runner assembly 56 are anchored together by a plurality of rivets 63, so that runner or driven wheel 58 and driven shaft 25 comprise a unit.

Slots or recesses 64 are made in the radially outward flange 65 of the ring baffle to receive the adjacent shouldered portions 66 of stamped metal blades 67 which are arranged in fan-like array in torus shell 58. Blades 67 have generally semi-circular contours to fit snugly into the inner concave face of shell 58 and are arranged with their straight edges adjacent the corresponding edges of driving blades 47. The curved margins of blades 67 have tabs 68 at their radially outer regions which are entered in an annular row of notches or recesses 69 in the adjacent region of torus shell 58 and there are intermediate tabs 70 on these blade margins which are received in adjacent notches or recesses 71 in the equatorial region of shell 58. Rivets 63 secure together the shaft flange 57, baffle flange 62 and shell flange 60, thus providing, with driven shaft 25, a unitary assembly which is adapted to be positioned in coactive relation to the driving members of the coupling prior to assembling the housing sections 14 and 20 by the continuous outside weld 23. A plurality of holes 72 through these side-by-side flanges, between rivets 63, port the accumulator chamber 22 to the fluid circuit within the torus shell assemblies 39 and 56.

From the foregoing it is apparent that the driving members, including housing section 14 and runner or drive wheel 39, are first assembled as a unit and attached to driving hub 11 by a continuous outside weld; next, the driven members, including runner or wheel 56 and tubular shaft 25, are arranged in coactive relation to the driving members; then the housing section 20 is secured in place by a continuous outside weld 23; and thereafter the seal 33 and sleeve nut 30 are inserted through the hollow hub region 29 of housing section 20. Each step is performed in a simple manner; there are no difficult inside welds required to hold the parts together; and there are no projections to interfere with or set up turbulence in the fluid circuit.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In a fluid coupling, rotatable driving hub having an annular flange and a shoulder; a hollow annular housing member forming one portion of an annular fluid chamber; a hollow semi-toroidal housing member forming another portion of said fluid chamber, the inner region of said semi-toroidal housing member resting on said hub shoulder; a driving wheel within said semi-toroidal housing member comprising an annular semi-toroidal shell having a cross-section substantially conforming with the cross-section of said semi-toroidal member and driven thereby; a ring baffle at the radially inward portion of said shell; radially positioned vanes of substantially semi-circular contour within said semi-toroidal shell; said vanes having means coacting with means on said shell and said baffle for mounting of said vanes in said shell; the radially inward portions of said housing, shell, and baffle being arranged in close relation to each other; rivets passed through said radially inward portions to provide a unitary assembly engaged with the flange on said driving means; and a readily accessible continuous exterior weld anchoring said unitary assembly to said driving flange.

2. A fluid coupling arrangement as defined in claim 1, wherein the housing members are positioned with their radially outward edges engaged with each other and united by a continuous exterior weld which is readily accessible for repair or replacement.

3. In a fluid coupling, rotatable driving means having an annular flange and a shoulder adjacent said flange; a hollow annular member forming one portion of an annular fluid housing; a hollow semi-toroidal member attached to said annular member and forming another portion of said fluid housing, said semi-toroidal member being attached by a continuous exterior weld to the annular flange of said driving member; an annular flange on the radially inward portion of said semi-toroidal member, said flange seated on the shoulder of said driving member and arranged in spaced relationship to said driving member flange, whereby a closed annular expansion chamber is provided exterior to said housing; and a driving vaned shell within said semi-toroidal member and attached to the flange thereof.

4. A fluid coupling for transmitting torque from a drive member to a driven member, comprising driving means having an annular flange and a shoulder; opposed hollow annular housing members, at least one of said members being of semi-toroidal cross-section and engaged with said driving means, hub and shoulder; means securing said housing members together to provide a closed fluid chamber; a vaned driving wheel in said semi-toroidal housing member, the radially inward portions of said semi-toroidal housing member and said driving wheel being side-by-side and riveted to each other to provide a unitary assembly which is engaged with the radially outer edge of the flange of said driving means; means uniting and sealing the juncture between said housing member and flange; the radially inward portions of said unitary assembly being spaced axially from said flange to define a closed annular space outside said fluid chamber; and port means in said side-by-side inner portions of the semi-toroidal housing member and driving member for establishing communication between said fluid chamber and said annular space.

5. A fluid coupling arrangement as defined in claim 4, wherein the means for securing the housing members together comprises a continuous exterior weld; and the means uniting and sealing the juncture between the semi-toroidal housing member and flange comprises a readily accessible continuous exterior weld at said juncture which is readily accessible for repair or replacement.

6. In a fluid coupling for transmitting torque from a drive member to a driven member, a drive hub having a radial flange and an axial shoulder; a housing comprised of two opposed hollow annular members at least one of which is of semi-toroidal cross-section and rests on said hub shoulder; and a vaned drive wheel riveted at its radially inward region to the radially inward region of said semi-toroidal housing member and providing therewith a unitary assembly adapted as a unit to be mounted on said drive hub with a portion of its housing member secured to the radial outer edge of said hub flange by a continuous exterior weld.

7. In a fluid coupling for transmitting torque from a drive member to a driven member, a drive hub having a radial flange; a housing comprised of a plurality of opposed hollow annular members at least one of which is of semi-toroidal cross-section; a vaned wheel in said housing secured at its radially inward region to the radially inward region of said semi-toroidal housing member and constituting therewith a unitary assembly adapted as a unit for mounting on said drive hub with a portion of its housing engaged with the outer region of said hub flange and being anchored thereto; and continuous means on the exterior of said housing for uniting said housing members to each other in enveloping relation to said vaned wheel.

8. In a fluid coupling for transmitting torque from a drive member to a driven member, a drive hub; a radial flange and an axial shoulder on said hub; a housing comprised of two opposed hollow annular members at least one of which is of semi-toroidal cross-section and is engaged with said hub flange and shoulder; a vaned drive wheel in said semi-toroidal housing member, the radially inward regions of said drive wheel and the adjacent housing member being positioned side-by-side and riveted to each other for providing a unitary assembly adapted as a unit to be mounted on said drive hub with a portion of its housing member anchored to the radially outer edge of said hub flange.

9. In a fluid coupling for transmitting torque from a drive member to a driven member, a drive hub having a radial flange; a housing comprised of a plurality of opposed hollow annular members at least one of which is of semi-toroidal cross-section, said housing members defining an annular fluid circuit chamber; a vaned wheel in said housing arranged with its radially inward region in side-by-side relation to the radially inward region of said semi-toroidal housing member; rivets joining said side-by-side regions to provide a unitary assembly adapted as a unit for mounting on said drive hub, with said riveted regions being off-set axially from the hub flange to define therewith an annular space exterior to the housing; means sealing and anchoring said unitary assembly to said hub flange; and port defining means establishing communication between said exterior annular space and said fluid circuit chamber.

HAROLD NUTT.

REFERENCES CITED

The following references are of record in the file of this patent:

UNITED STATES PATENTS

| Number | Name | Date |
| --- | --- | --- |
| 2,061,997 | Dunn | Nov. 24, 1936 |
| 2,104,605 | Boldt | Jan. 4, 1938 |
| 2,304,336 | Carlson et al. | Dec. 8, 1942 |
| 2,311,958 | Neracher | Feb. 23, 1943 |
| 2,328,393 | Neracher et al. | Aug. 31, 1943 |
| 2,343,786 | Martin | Mar. 7, 1944 |
| 2,358,469 | Neracher | Sept. 19, 1944 |
| 2,372,748 | Swift | Apr. 3, 1945 |